United States Patent
Pavan

(10) Patent No.: US 9,237,690 B2
(45) Date of Patent: Jan. 19, 2016

(54) EQUIPMENT FOR CUTTING, COLLECTING AND DYNAMIC PROCESSING OF GRASS

(76) Inventor: Paulo Pavan, Guararema SP (BR)

( * ) Notice: Subject to any disclaimer, the term of this patent is extended or adjusted under 35 U.S.C. 154(b) by 732 days.

(21) Appl. No.: 12/991,786

(22) PCT Filed: May 20, 2009

(86) PCT No.: PCT/BR2009/000140
§ 371 (c)(1),
(2), (4) Date: Apr. 4, 2011

(87) PCT Pub. No.: WO2009/140748
PCT Pub. Date: Nov. 26, 2009

(65) Prior Publication Data
US 2011/0173943 A1  Jul. 21, 2011

(30) Foreign Application Priority Data
May 20, 2008  (BR) ..................................... 0801647

(51) Int. Cl.
 *A01D 34/42* (2006.01)
 *A01D 43/08* (2006.01)
 *A01D 34/43* (2006.01)

(52) U.S. Cl.
 CPC .............. *A01D 34/435* (2013.01); *A01D 34/42* (2013.01); *A01D 43/08* (2013.01)

(58) Field of Classification Search
 USPC ........ 56/198, 199, 194, 156, 249, 320.1, 202, 56/DIG. 12, 7, 16.4 A
 See application file for complete search history.

(56) References Cited

U.S. PATENT DOCUMENTS

| | | | | |
|---|---|---|---|---|
| 648,600 A | * | 5/1900 | Stair | 56/259 |
| 1,167,051 A | * | 1/1916 | Doak | 15/55 |
| 1,255,275 A | * | 2/1918 | Barnett et al. | 198/659 |
| 1,587,349 A | * | 6/1926 | Otis et al. | 56/128 |
| 1,607,382 A | * | 11/1926 | Zakrzewsky | 56/238 |
| 1,769,254 A | * | 7/1930 | Campbell | 56/17.6 |
| 2,189,859 A | * | 2/1940 | Evans | 15/85 |
| 2,270,646 A | * | 1/1942 | Campbell | 56/14.4 |
| 2,449,042 A | * | 9/1948 | Abbrecht | 56/249 |
| 2,505,576 A | * | 4/1950 | Reitan | 56/13.2 |
| 2,517,184 A | * | 8/1950 | Elliott et al. | 56/249 |

(Continued)

FOREIGN PATENT DOCUMENTS

| FR | 2 224 071 A1 | 10/1974 |
|---|---|---|
| FR | 2 522 535 A1 | 9/1983 |

(Continued)

OTHER PUBLICATIONS

International Search Report and Written Opinion mailed Oct. 7, 2009 of corresponding international application PCT/BR2009/000140, filed May 20, 2009.

(Continued)

*Primary Examiner* — Thomas B Will
*Assistant Examiner* — Joan D Misa
(74) *Attorney, Agent, or Firm* — Alston & Bird LLP

(57) ABSTRACT

The present invention refers to an mowing equipment (100) for cutting, collecting and dynamic processing of grass used for grass mowing, which, as well as mowing, innovates on gathering the mowed grass and proceeding on its dynamic processing, in order to transform the mowed and gathered grass amount in a disaggregated mass, similar to powder that is returned to the soil, thus being exempted from any subsequent steps on combing, sweeping, or picking.

26 Claims, 7 Drawing Sheets

(56) References Cited

U.S. PATENT DOCUMENTS

| | | | | |
|---|---|---|---|---|
| 2,685,774 A * | 8/1954 | Williams | | 56/249 |
| 2,697,846 A * | 12/1954 | Wilcox et al. | | 15/83 |
| 2,734,328 A * | 2/1956 | Wood | | 56/16.7 |
| 3,184,777 A * | 5/1965 | Norden | | 15/340.3 |
| 3,241,172 A * | 3/1966 | Tilgner | | 15/183 |
| 3,487,612 A * | 1/1970 | Everett et al. | | 56/11.3 |
| 3,668,730 A * | 6/1972 | Scharmann et al. | | 15/83 |
| 3,716,972 A * | 2/1973 | Case et al. | | 56/1 |
| 3,754,384 A * | 8/1973 | Case et al. | | 56/14.4 |
| 3,783,592 A * | 1/1974 | Schraut | | 56/13.3 |
| 3,805,310 A * | 4/1974 | Oberdank | | 15/83 |
| 3,837,157 A * | 9/1974 | Van Der Lely | | 56/14.5 |
| 3,884,019 A * | 5/1975 | Gerzanich | | 56/12.7 |
| 3,921,373 A * | 11/1975 | Rubin | | 56/16.6 |
| 3,946,543 A * | 3/1976 | Templeton | | 56/10.9 |
| 4,037,284 A * | 7/1977 | McDonald | | 15/83 |
| 4,055,037 A * | 10/1977 | Oosterling et al. | | 56/16.4 R |
| 4,250,695 A * | 2/1981 | Comer et al. | | 56/12.7 |
| 4,503,630 A * | 3/1985 | Riley | | 37/94 |
| 4,516,390 A * | 5/1985 | Klinner | | 56/364 |
| 4,563,867 A * | 1/1986 | Bokon | | 56/249 |
| 4,620,341 A * | 11/1986 | Rigby | | 15/339 |
| 4,720,962 A * | 1/1988 | Klinner | | 56/10.2 R |
| 4,771,504 A * | 9/1988 | VanGinhoven et al. | | 15/348 |
| 4,796,322 A * | 1/1989 | Steed et al. | | 15/79.2 |
| 4,895,476 A * | 1/1990 | Vangaever | | 404/108 |
| 4,920,737 A * | 5/1990 | Wieneke | | 56/249 |
| 4,970,852 A * | 11/1990 | Check et al. | | 56/199 |
| 5,121,592 A * | 6/1992 | Jertson | | 56/344 |
| 5,134,838 A * | 8/1992 | Swisher et al. | | 56/16.6 |
| 5,240,188 A * | 8/1993 | Whitmire | | 241/29 |
| 5,369,832 A * | 12/1994 | Hagger | | 15/83 |
| 5,687,555 A * | 11/1997 | Klein | | 56/249 |
| 5,822,965 A * | 10/1998 | Chesack et al. | | 56/249 |
| 5,848,521 A * | 12/1998 | Kobayashi | | 56/13.2 |
| 6,029,433 A * | 2/2000 | Westbrook et al. | | 56/249 |
| 6,421,870 B1 * | 7/2002 | Basham et al. | | 15/83 |
| 6,658,833 B2 * | 12/2003 | Dunning et al. | | 56/202 |
| 6,904,742 B2 * | 6/2005 | Dunning et al. | | 56/202 |
| 7,114,317 B2 * | 10/2006 | Dunning et al. | | 56/202 |
| 7,329,297 B2 * | 2/2008 | Dunning et al. | | 55/385.1 |
| 7,354,466 B2 * | 4/2008 | Dunning et al. | | 55/385.1 |
| 7,762,052 B2 * | 7/2010 | Dunning et al. | | 56/344 |
| 7,775,025 B1 * | 8/2010 | Coffin et al. | | 56/249 |
| 7,837,751 B2 * | 11/2010 | Dunning et al. | | 55/385.1 |
| 8,316,628 B2 * | 11/2012 | Humphrey | | 56/249 |

FOREIGN PATENT DOCUMENTS

| | | |
|---|---|---|
| FR | 2 542 970 A1 | 9/1984 |
| FR | 2 595 191 A1 | 9/1987 |
| FR | 2 721 234 A1 | 12/1995 |
| GB | 1 180 381 A | 2/1970 |
| WO | WO 83/02383 A1 | 7/1983 |
| WO | WO 2007/085820 A1 | 8/2007 |

OTHER PUBLICATIONS

Reply to the Written Opinion mailed Oct. 7, 2009, submitted Mar. 18, 2010 of corresponding international application PCT/BR2009/000140, filed May 20, 2009.

International Preliminary Report on Patentability completed Aug. 4, 2010 of corresponding international application PCT/BR2009/000140, filed May 20, 2009.

* cited by examiner

EQUIPMENT FOR CUTTING, COLLECTING AND DYNAMIC PROCESSING OF GRASS

CROSS REFERENCE TO RELATED APPLICATIONS

This application is a national stage application, filed under 35 U.S.C. §371, of International Application No. PCT/BR2009/000140, filed May 20, 2009, which claims priority to Brazilian Application No. PI0801647-0, filed May 20, 2008, all of which are hereby incorporated by reference in their entirety.

BACKGROUND OF THE INVENTION

1. Field of Invention

The present invention refers to an mowing equipment for cutting, collecting and dynamic processing of grass that innovates on gathering the mowed grass and proceeding on its processing needing, thus, no subsequent steps on combing, sweeping, or picking.

2. Description of Related Art

As it is common known, maintenance of grassy areas, whether private or even in public areas, demands a set of frequent proceedings, among which mowing and gathering the mowed grass afterwards, whether by means of combing, sweeping, or even picking.

Thus, depending on the size of the grassy area, there are several types of equipments, from mechanic mowers activated by human force to electric mowers, or activated by internal combustion engines (two-stroke engine), or even small vehicles shaped like micro tractors which are driven by the operator.

As to the type of mowing, the current mowers comprise: a) helical blades mounted on a horizontal oblong rotor (normally used in mechanic mowers activated by human force); b) plastic wire disposed in a rotary coil (used in small electric mowers, wherein the wire makes the mowing and is set apart when wasted); and c) metallic rotary blades on several embodiments (employed in the several types of mowers).

Generally, conventional mowers, having rare exceptions, simply make the grass mowing, wherein the recently mowed material must be gathered, otherwise it may be spread by wind, rain, possibly causing damages like obstruction of water outflow galleries, etc.

Some few sophisticated models of mowers comprise some kind of recently mowed grass suction, which is directed to a bag-shaped compartment, which must be periodically emptied.

This latter type of mower, besides does not require the gathering of the recently mowed grass, is not capable of gathering small sticks and other wastes eventually present on the area to be worked on, and invariably still implies on the operation in which the amount of the suctioned and gathered grass must be later put away in a suitable way.

Regarding this context, was developed the present equipment for cutting, collecting and dynamic processing of grass, which promotes grass mowing in a previously defined level, immediately performing the gathering of the mowed grass, and continuously performing the dynamic grass processing, as well, by means of an effect analogous to the grating.

BRIEF SUMMARY OF THE INVENTION

The present invention refers to as mowing equipment for dynamic processing of grass, comprising a basic structure partially covered by a careen; an horizontal rotary axis comprising a plurality of brushes; the brushes comprising a plurality of bristles responsible for mowing; the horizontal rotary axis being configured to have its operation height adjustable to regulate the bristles mowing height; the mowing equipment being characterized in that the basic structure comprises a storing compartment defined as a space between an upper portion of the back of the basic structure and a slope plate, the slope plate being angularly backed to the soil and being capable of mowing the grass and storing it in the storing compartment.

DETAILED DESCRIPTION OF VARIOUS EMBODIMENTS OF THE INVENTION

Figure 1:
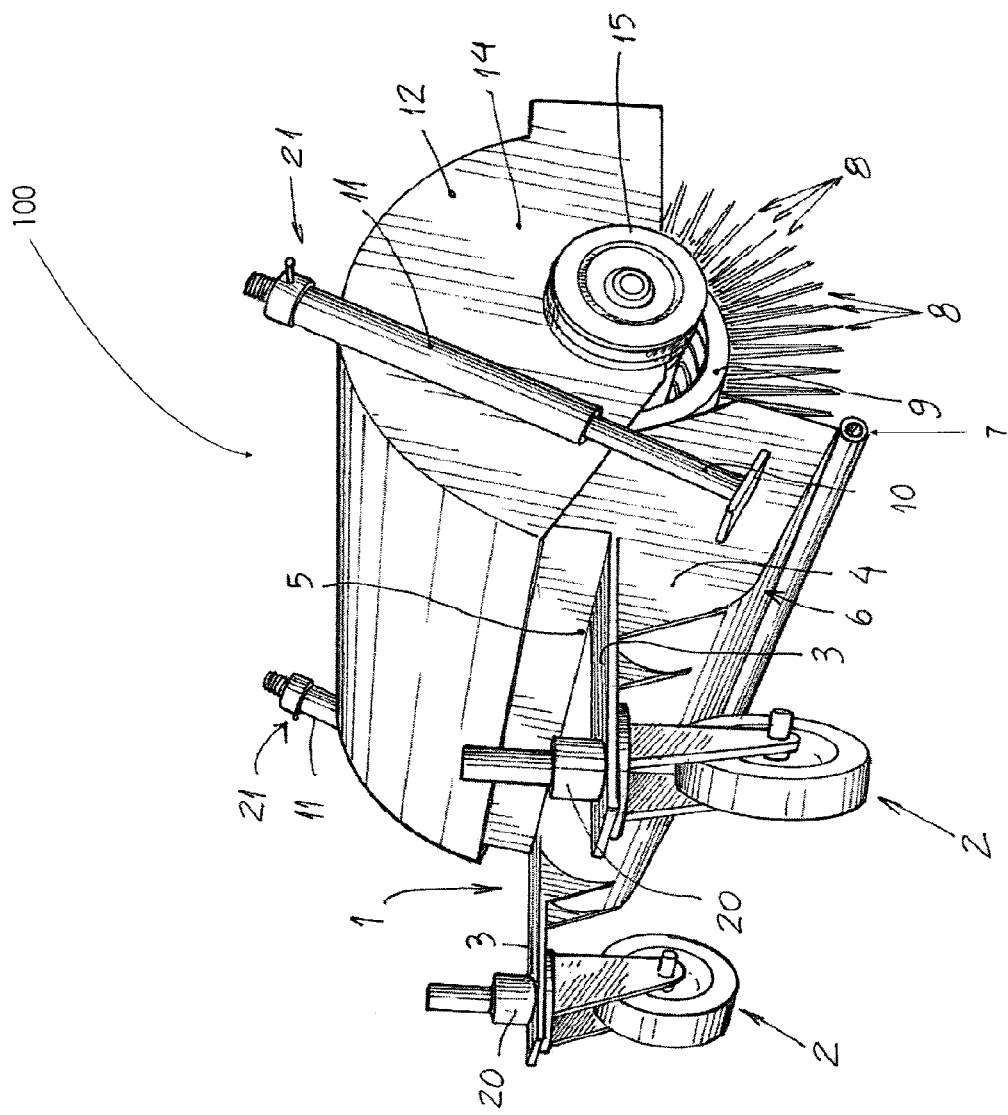
FIG. 1 illustrates a perspective general view of the equipment here proposed.
Figure 2:
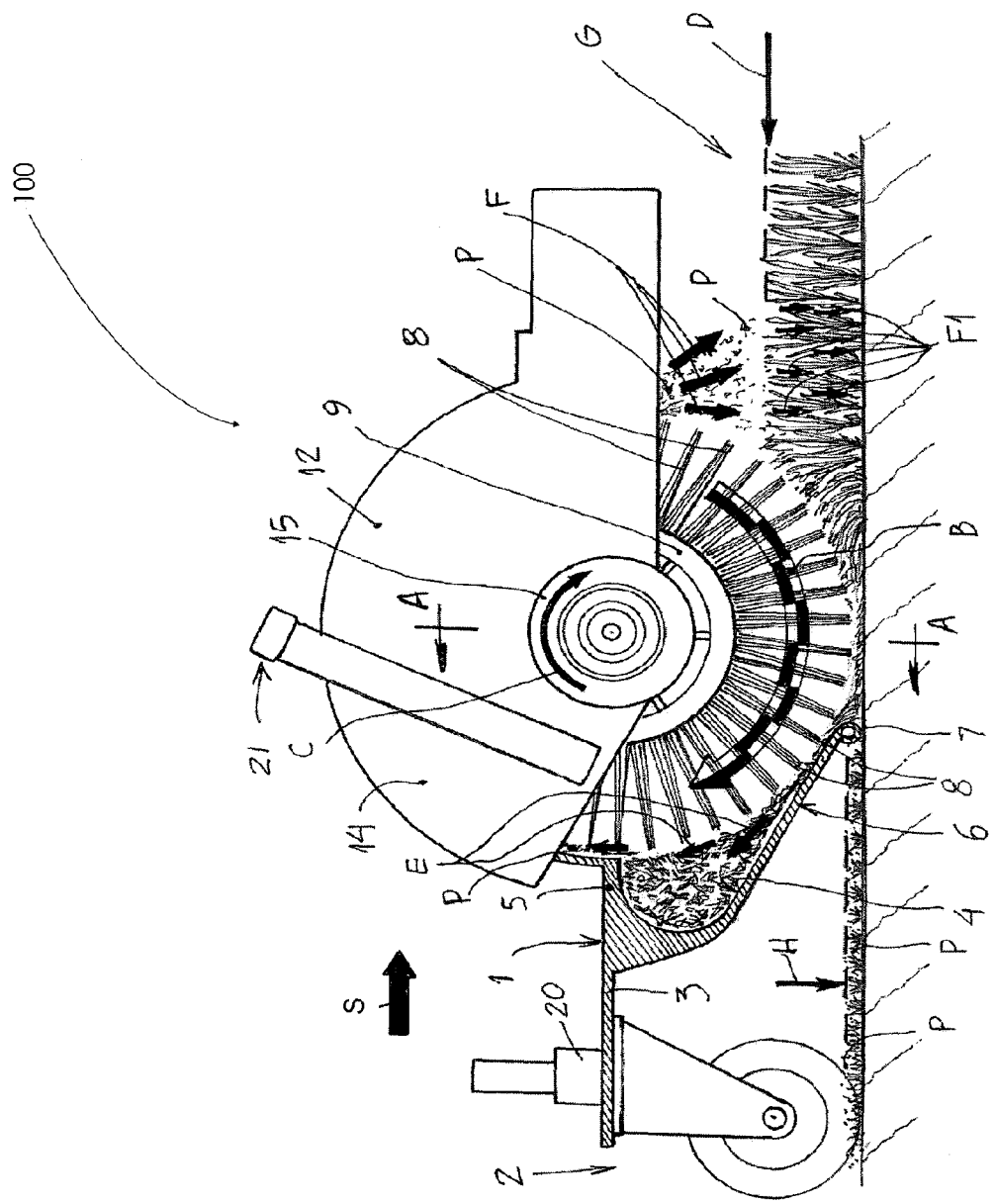
FIG. 2 illustrates a schematic and partial sectional view of said equipment, wherein it is laterally showed, and in a condition that shows in a schematic way as well its operational way.
Figure 3:
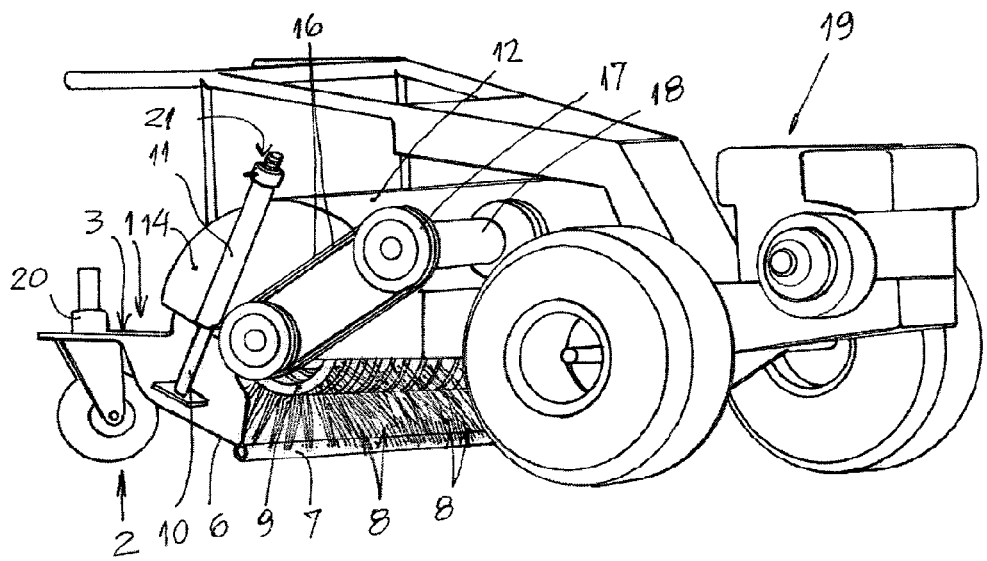
FIG. 3 illustrates a view wherein the equipment herein described is attached to a driving unity popularly known as "mechanical mule", which helps in the condition on the equipment positioning on the soil, as well as provides the motor force to activate the set of rotary brushes of the equipment.
Figure 4:
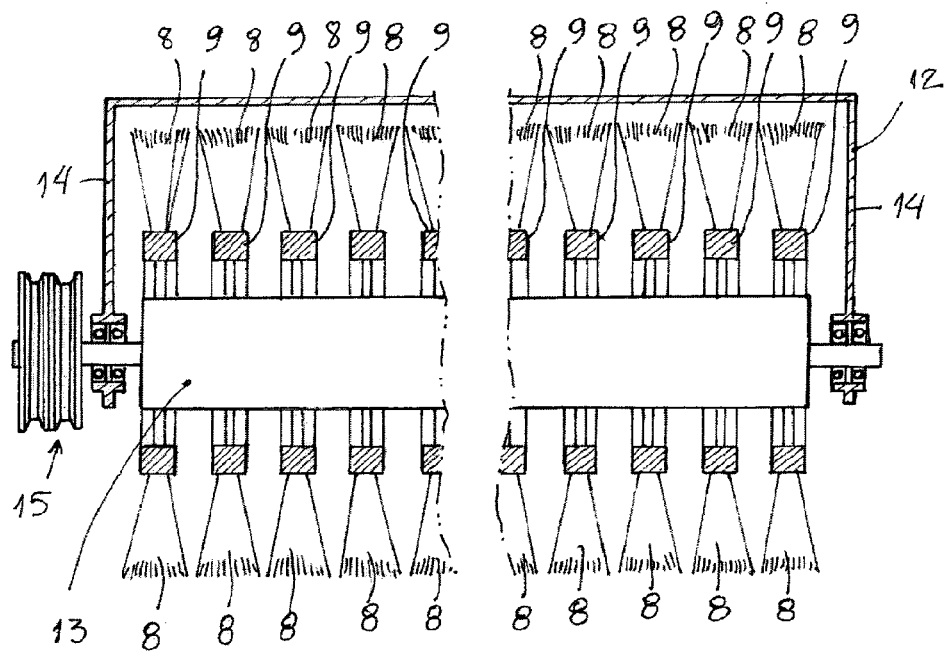
FIG. 4 illustrates a schematic section view according to cutline A-A from FIG. 2, wherein rotary brushes may be schematically viewed by another angle.
Figure 5:
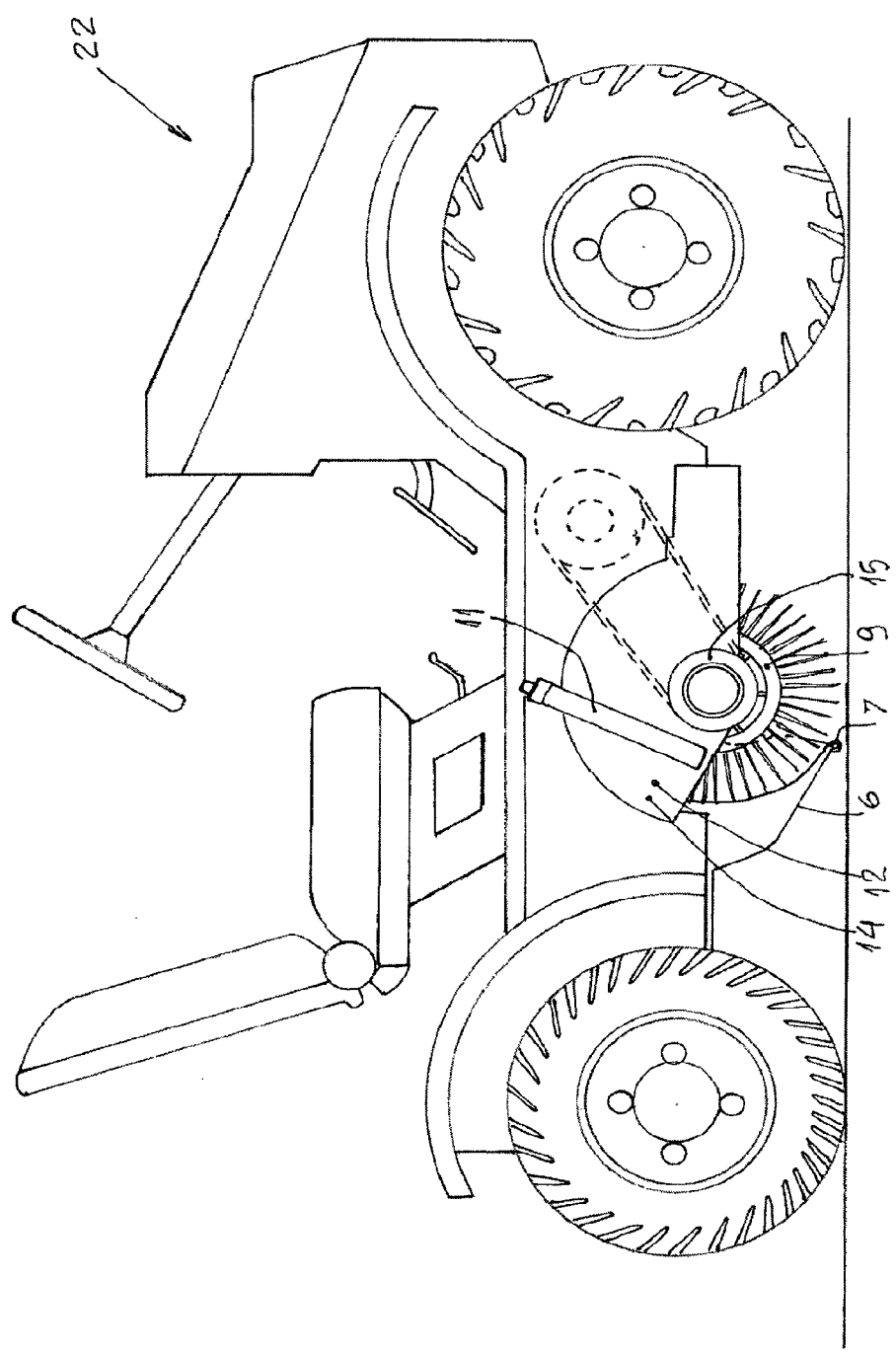
FIG. 5 schematically illustrates a first alternative way of using the equipment herein proposed, wherein it is designed to be incorporated as an integrated part of a vehicle as a micro tractor.
Figure 6:
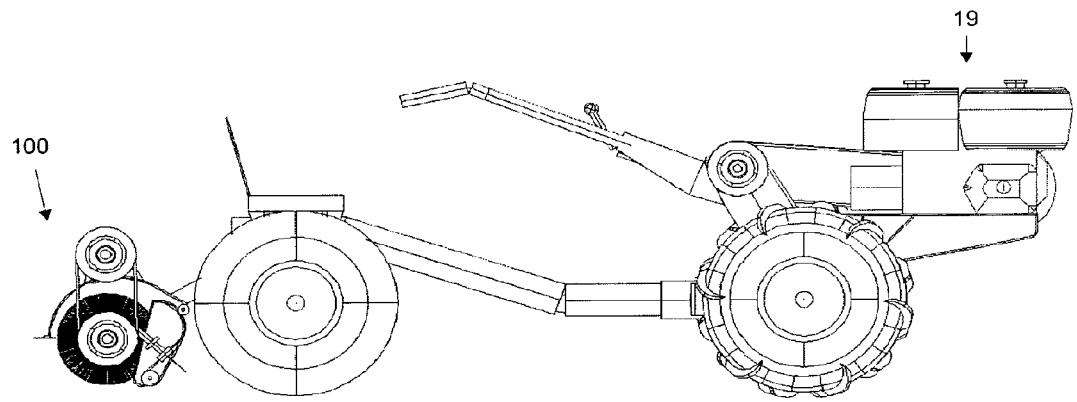
FIGS. 6, 7, and 8 schematically illustrate a second alternative way of using the equipment herein proposed, wherein it is designed to be towed by a vehicle as a tractor.
Figure 7:
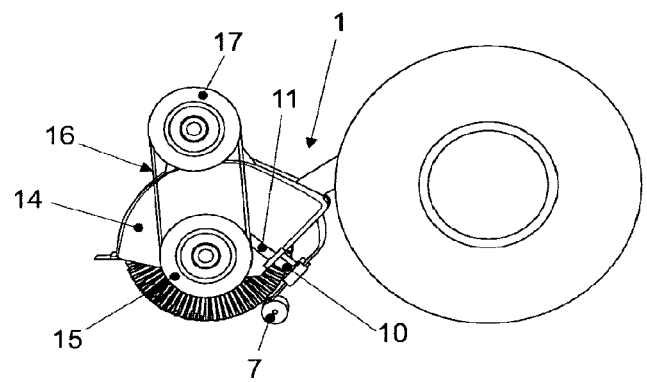
Figure 8:
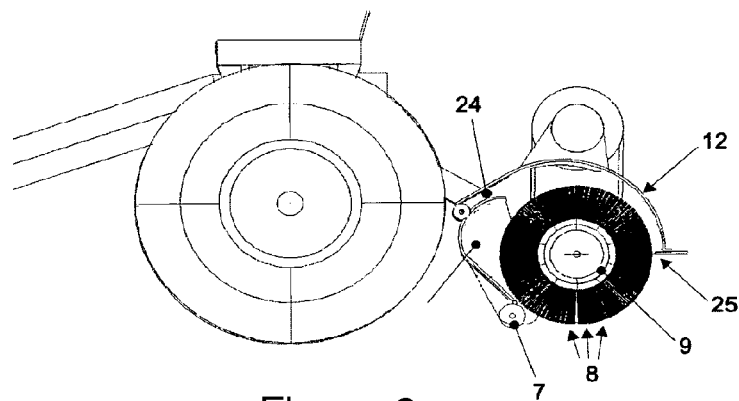
Figure 9:
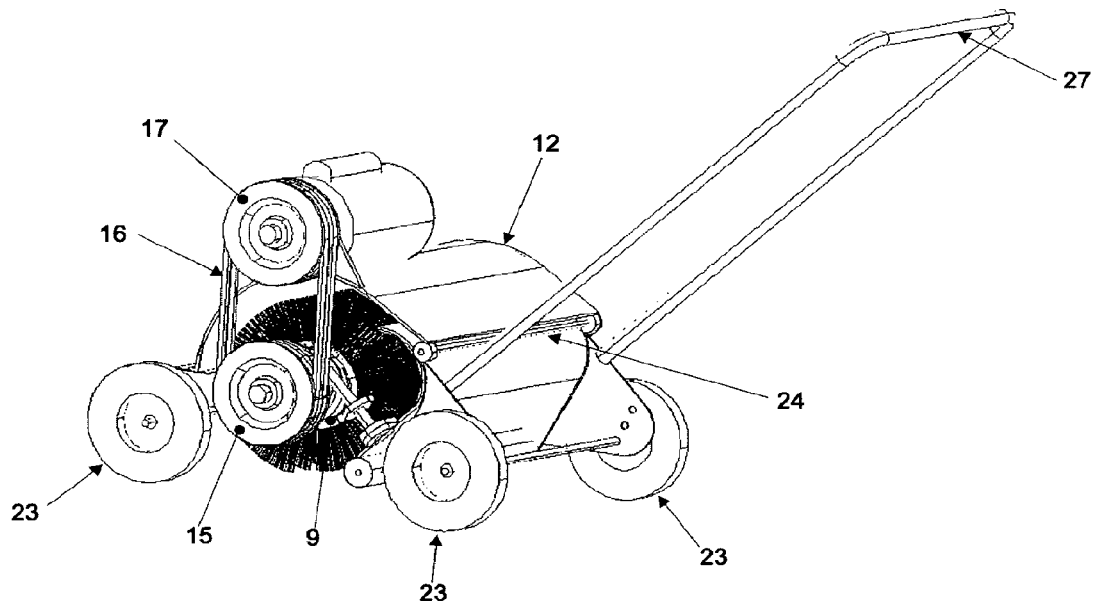
FIGS. 9 and 10 schematically illustrate an embodiment wherein the equipment herein described is adapted in a mower cart which is impulsed by the user.
Figure 10:
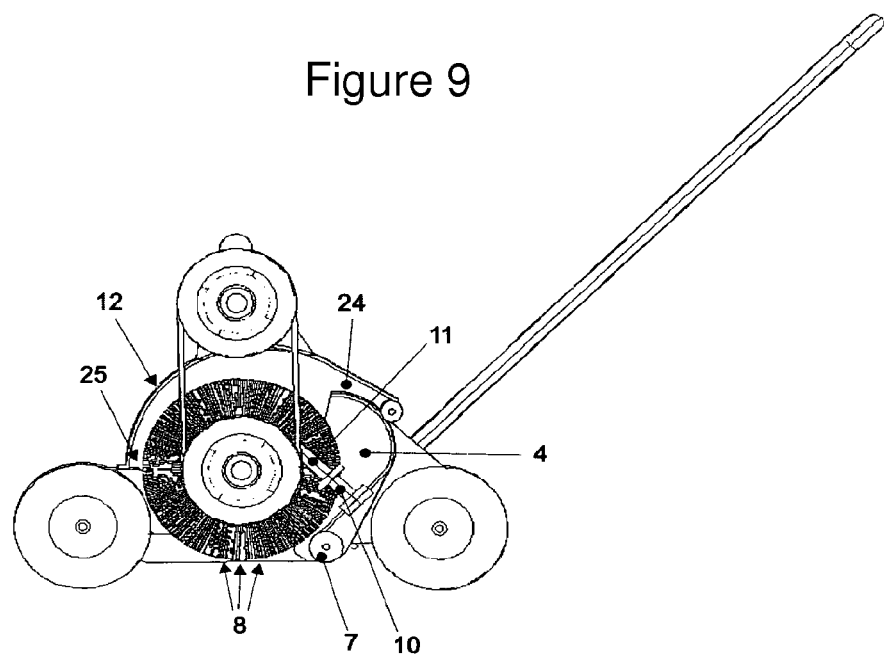
Figure 11:
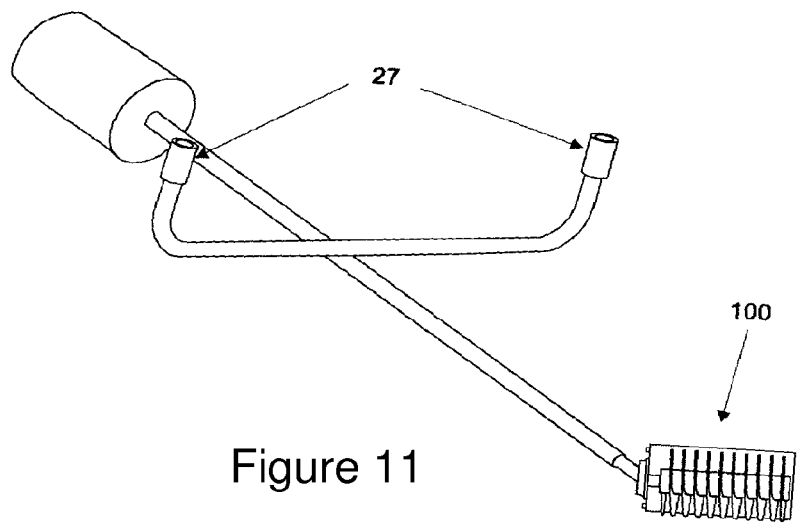
FIGS. 11, 12, and 13 schematically illustrate an embodiment wherein the equipment herein described is adapted in a brush cutter, which operates in the region reached by the body movement performed by its operator.
Figure 12:
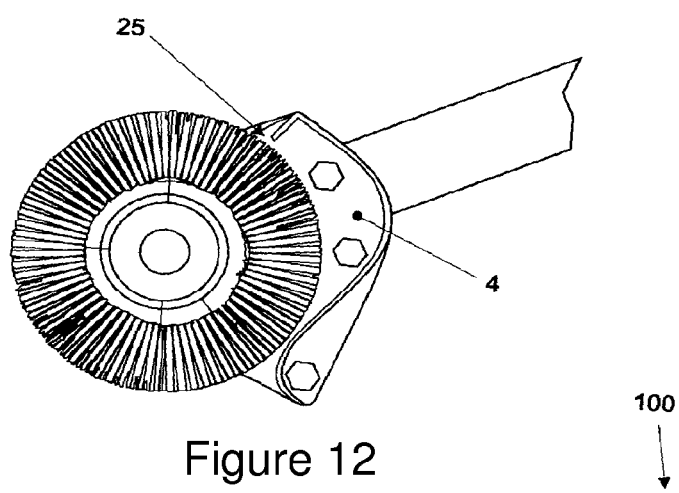
Figure 13:
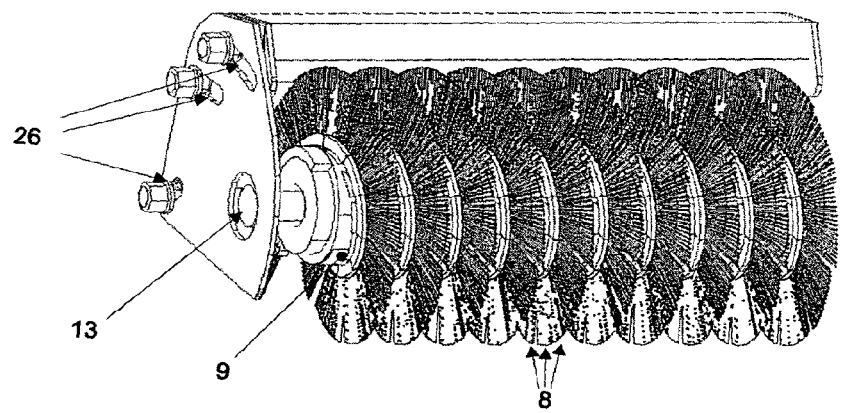

The equipment herein described processes the mowing by means of a newly device, which is not based on any of those devices conventionally used in the mowers comprised in the state of art, that is, the mowing device proposed in the present invention is not based on helical blades, plastic wires, or even metallic rotary blades of any type.

The equipment object of this invention is based on the concept of providing a multiplicity of rotary brushes, each one of them having metallic bristles, which are arranged in such a way to form a mechanic set to be activated in high rotations (around 2000 RPMs). The metallic bristles can be preferably produced in steel, although other suitable materials may be used.

Further in the constructive concept herein proposed, the set of rotary brushes is mounted along a horizontal axis placed in a careen structure that is mounted in the basic structure of the equipment, said structure that contemplates an internal compartment for putting the mowed material, wherein it is stored and dynamically processed.

The newly equipment herein described does not require gathering the recently mowed grass, sticks and other wastes present in the areas to be worked on, but promotes it processing by means of grating such material through the action of the same rotary brush that mows the grass, thus allowing such mowed and processed (grated) material to be developed to the soil as a pulverization.

The equipment herein presented, besides being exempted from the later steps of brushing, sweeping, or picking, which are indispensable after using the conventional equipments (exception to a few models that aspire and gather the recently mowed grass), it takes the grass back to the grassy area, allowing, then, the mowed material to return to the soil as nutrient, which, on the other way, would be totally lost.

The equipment object of this invention may be totally understood in all constructive and functional details performed from the figures herein presented.

The equipment for cutting, collecting and dynamic processing of grass, object of the present invention, comprises a basic structure 1 partially covered by a careen structure 12, and comprising at least a horizontal rotary axis 13, said axis 13 comprising a plurality of brushes 9, said brushes 9 comprising a plurality of bristles 8 responsible for the mowing. The basic structure 1 comprises a storing compartment 4 capable of receiving the mowed material and the horizontal rotary axis 13 being able of normally displacing to the soil in multiple distances regulating the height of the bristles mowing.

Preferably, the storing compartment 4 of the equipment for cutting, collecting 100, and dynamic processing of grass of the present invention is defined as a space between an upper portion 5 of the back of the basic structure 1 and a slope plate 6 angularly backed to the soil. The slope plate 6 has a tubular profile 7 in its lower border, which acts by delimiting the action field of the bristles 8 edge from each of the rotary brushes 9. Said tubular profile 7 may present shapes comprising square, hexagon, U profile, folded plate, roller with bearing, and other suitable shapes.

Additionally, the storing compartment 4 may also comprise, at least a slot 24, preferably disposed between the careen structure 12 and the storing compartment 4, as well as it may comprise a narrow 25 in the mowed material outlet, which, in such case, it is done by employing a wing extending along the horizontal rotary axis 13 length, and it comprises one of the side borders closed to the region wherein the bristles 8 pass while doing its rotary movement.

The basic structure 1 of the equipment for cutting, collecting 100, and dynamic processing of grass of the present invention may also comprise in its back edge, a pair of rollers directionally free 2 mounted in respective structural support projections 3. Laterally, the basic structure 1 of the equipment for grass mowing 100 of the present invention may count on columns 10 disposed parallel to each other and having angle in relation to the soil surface, which receive and are involved by tubular gloves 11 that are mounted in the side of the careen structure 12. Regarding this context, the careen structure 12 is crossed by the horizontal rotary axis 13 born along the side walls 14 of the said careen structure 12, wherein along the said horizontal rotary axis 13 it is mounted the multiple brushes 9 and the bristles 8. The horizontal rotary axis 13 in one of its side edges counts on a set of pulleys 15. The regulation of the bristles 8 cutting level is obtained by means of adjusting the level of cutting 21 that operates along with the columns 10 and tubular gloves 11. The means of adjust of the cutting level 21 comprise a system of screw/nut. The regulation of operation height of the equipment for cutting, collecting 100, and dynamic processing of grass of the present invention is, preferably, promoted by means of adjusting of operation height 20 incorporated on the pair of rollers directionally free 2. The means of adjust of the operation height comprise a system of screw/nut. The horizontal rotary axis 13 spin and, consequently, the bristles 8 applies to the non mowed grass a continuous effect of impact and waste against the lower border of the slope plate 6. The grass is recently mowed in a first moment and, in a second moment, it is stored in a storing compartment 4. The stored grass in the storing compartment 4 is, then, submitted to the continuous spin effect of the bristles 8, which promotes, in a third movement, the processing by means of grating of the grass amount stored in the storing compartment 4. The bristles action 8 reduces the recently mowed grass to a particulate material similar to powder. The particulate material (reduced to powder) originated from the bristles action 8 due to the effect of the rotary horizontal axle spin is returned to the soil in a fourth moment. Variations may be employed in the mowing equipment 100, aiming at improving the grating process of the mowed material. One of those variations consists of the mowing equipment 100 comprising at least one slot 24 capable of providing air passage from outside the careen structure 12 to inside the storing compartment 4, airing the mowed wastes and increasing it recirculation in the region placed between the careen 12 and the brush 9, and also of the storing compartment 4, making the said wastes get more times in contact with the brush, thus resulting in the release of even smaller wastes. A second possible variation consists on the narrow 25 of the mowed material outlet area, preferably done by employing a wing, fixed to the structure of the careen 12, which extends along the horizontal rotary axis 13 length and comprises one of its side borders closed to the region wherein the free edges of the bristles 8 pass during the brush rotary movement 9, such narrow 25 reduces the mowing wastes, making the waste amount which cannot leave, to be grated again, thus reducing even more the dimensions of the mowing wastes before they leave the mowing equipment 100.

The mowing equipment 100 of the present invention is embodied as a fitting to be aggregated and attached to a motor unit 19 of general use. It may be used in the back of a tractor being towed by said tractor as agricultural fitting or weeder. When aggregated and attached to a motor unit 19 of general use, the activation of horizontal rotary axis 13 of the mowing equipment 100 of the present invention may be obtained by connecting the set of pulleys 15 to a set of motor pulley 17 from a power switch 18 of the said motor unit 19 before employment of belts 16. The pulleys 17 may be activated and moved by several types of engines compatible with the function, including, among those, hydraulic and electric engines. Said equipment may fully incorporate an exclusive vehicle addressed to grass mowing and processing. The vehicle herein described may be any vehicle compatible with the invention. Preferably, the vehicle has a micro tractor shape 22. The present invention also refers to a vehicle comprising the equipment for mowing 100 of the present invention. Preferably, the vehicle that comprises the equipment for mowing of the present invention has a micro tractor shape 22.

Another constructive variation consists of the fact that the equipment for mowing 100 be adapted in a grass mower cart, which has wheels 23 capable of providing its displacement, said displacement being able to be provided from a motor source or by application of force by the user, in the maniple 27, by pushing the grass mower cart in the desired directions.

Another constructive variation consists of the grating equipment 100 being adapted in a brush cutter, which is handled by the user by the maniples 27, and comprises an advantage of presenting a big versatility regarding to the characteristics of the workplace, being able to be operated from any region that is comprised in the space formed by the body movement performed by the operator that handles such brush cutter. In such embodiment, it is also noticed the presence of at least one guide for height adjust 26, responsible to regulate the height of the horizontal rotary axis 13, and consequently the brush 9, in relation to the soil, aiming at adjusting the mowing height or compensating the waste suffered by the brush 9 along with its using time.

After being described some examples of preferred concretion, it must be understood that the scope of the present invention ranges other possible variations, being limited just by the attached claims, wherein the possible equivalents are included.

The invention claimed is:

1. Mowing equipment for dynamic processing of grass planted in soil, said mowing equipment comprising:
    a horizontal rotary axle having mounted thereto a plurality of brushes, each of the plurality of brushes comprising a plurality of bristles responsible for cutting the grass planted in the soil upon impact therewith, the horizontal rotary axle lying in a horizontal plane and defining perpendicular thereto a vertical plane extending between the axle and a point of impact between the plurality of bristles and the grass; and
    a storage structure having an upper portion and a lower portion, the upper portion being positioned above the horizontal plane, the lower portion being positioned below the horizontal plane and at a location spaced from the vertical plane and subsequent to the point of impact between the plurality of bristles and the grass,
    wherein:
        the lower portion of the storage structure comprises a single slope plate positioned at an obtuse angle relative to the soil surface and relative to the upper portion of the storage structure, such that a combination of the single slope plate, the upper portion, and the plurality of bristles, defines a grass storing pocket; and
        the plurality of bristles is positioned at a distance relative to the upper portion that is less than a distance of the plurality of bristles relative to at least a portion of the single slope plate and the grass storing pocket defined at least in part thereby, such that the plurality of bristles are configured to retain cut grass in the grass storing pocket until sufficient contact occurs between the plurality of bristles and the cut grass to reduce the cut grass to a size small enough to permit passage thereof between the upper portion and the plurality of bristles and toward discharge from the mowing equipment.

2. Mowing equipment for dynamic processing of grass, according to claim 1, wherein the single slope plate comprises a lower border having a tubular profile, which acts by delimiting the action field of an edge of the plurality of bristles of each of the brushes.

3. Mowing equipment for dynamic processing of grass, according to claim 1, wherein the storage structure further comprises at least one air inlet slot disposed between a housing structure and the grass storing pocket.

4. Mowing equipment for dynamic processing of grass, according to claim 1, wherein the storage structure further comprises at least one narrow structure disposed between a housing structure and the plurality of brushes.

5. Mowing equipment for dynamic processing of grass, according to claim 1, wherein the mowing equipment further comprises a pair of rollers directionally free mounted in respective structural support projections, wherein the pair of rollers are operatively connected to the storage structure in a manner such that the grass storage pocket of the storage structure is positioned intermediate the pair of rollers and the horizontal rotary axle.

6. Mowing equipment for dynamic processing of grass, according to claim 1, wherein the mowing equipment further comprises columns disposed parallel to each other and oriented at an acute angle relative to the soil surface, the columns being configured to mate with tubular gloves that are mounted in the side of a housing structure.

7. Mowing equipment for dynamic processing of grass, according to claim 1, wherein a housing structure is crossed by the horizontal rotary axle born along the side walls of the housing structure, and wherein the plurality of brushes are mounted along said horizontal rotary axle.

8. Mowing equipment for dynamic processing of grass, according to claim 1, wherein at least one side edge of the horizontal rotary axle counts on a set of pulleys.

9. Mowing equipment for dynamic processing of grass, according to claim 1, wherein the regulation of a height of the plurality of bristles is obtained by adjusting columns and tubular gloves.

10. Mowing equipment for dynamic processing of grass, according to claim 9, wherein adjusting a cutting level of the plurality of bristles comprises a screw and nut system.

11. Mowing equipment for dynamic processing of grass according to claim 1, wherein the regulation of a height of the plurality of bristles is promoted by adjustment of an operation height incorporated on a pair of rollers directionally free mounted in respective structural support projections.

12. Mowing equipment for dynamic processing of grass, according to claim 11, wherein the adjustment of the operation height comprises a screw and nut system.

13. Mowing equipment for dynamic processing of grass according to claim 1, wherein a spin of the horizontal rotary axle and, consequently the plurality of bristles, applies to the non-mowed grass a continuous spin effect of impact and waste against the lower border of the single slope plate.

14. Mowing equipment for dynamic processing of grass according to claim 1, wherein the grass cut in a first moment is stored in the grass storing pocket in a second moment.

15. Mowing equipment for dynamic processing of grass according to claim 14, wherein the cut grass stored in the grass storing pocket is submitted to a continuous spin effect of the plurality of bristles, which promotes, in a third moment, the processing by grating of the cut grass stored in the grass storing pocket, whereby said grating provides sufficient contact between the plurality of bristles and the cut grass to reduce the cut grass to the size small enough to permit the passage thereof between the upper portion and the plurality of bristles and toward the discharge thereof from the mowing equipment.

16. Mowing equipment for dynamic processing of grass according to claim 15, wherein the size small enough to permit the passage involves the plurality of bristles reducing the cut grass to a particulate material.

17. Mowing equipment for dynamic processing of grass according to claim 16, wherein the particulate material originates from an action of the plurality of the bristles, and wherein due to the effect of a spin of the horizontal rotary axle the particulate material is returned to the soil in a fourth moment.

18. Mowing equipment for dynamic processing of grass according to claim 1, wherein said equipment is embodied as a fitting to be aggregated and attached to a motor unit of general use.

19. Mowing equipment for dynamic processing of grass according to claim 18, wherein the mowing equipment is aggregated and attached to a motor unit of general use, and wherein the activation of the horizontal rotary axle is obtained by connecting a set of pulleys to a set of motor pulleys from a power switch of the said motor unit before employment of belts.

20. Mowing equipment for dynamic processing of grass according to claim 1, wherein said equipment fully incorporates an exclusive vehicle designed for grass mowing and processing.

21. Mowing equipment for dynamic processing of grass, according to claim 20, wherein the vehicle has the shape of a micro tractor.

22. Mowing equipment for dynamic processing of grass according to claim 1, wherein said equipment is capable of being towed by a vehicle.

23. Mowing equipment for dynamic processing of grass according to claim 1, wherein said equipment fully incorporates a grass mower cart.

24. Mowing equipment for dynamic processing of grass according to claim 1, wherein said equipment is incorporated in a brush cutter.

25. Vehicle comprising the mowing equipment as defined in claim 1.

26. Vehicle according to claim 25, wherein the vehicle has the shape of a micro tractor.

* * * * *